United States Patent [19]
Culver

[11] 3,943,357
[45] Mar. 9, 1976

[54] REMOTE CONTROLLED VEHICLE SYSTEMS

[76] Inventor: William Howard Culver, 2841 Chesapeake St., NW., Washington, D.C. 20008

[22] Filed: Aug. 31, 1973

[21] Appl. No.: 393,468

[52] U.S. Cl............................... 250/199; 244/77 R
[51] Int. Cl.².......................................... H04B 9/00
[58] Field of Search............... 178/DIG. 1; 250/199; 343/225; 244/3.11, 3.12, 3.16, 3.19, 77 R, 77 C; 350/96 R, 96

[56] References Cited
UNITED STATES PATENTS

| | | | |
|---|---|---|---|
| 2,995,740 | 8/1961 | Shreckengost | 178/DIG. 1 |
| 3,241,145 | 3/1966 | Petrides | 325/115 |
| 3,766,392 | 10/1973 | Nelson et al. | 250/199 |

FOREIGN PATENTS OR APPLICATIONS

| | | | |
|---|---|---|---|
| 2,012,293 | 3/1970 | Germany | 250/199 |

Primary Examiner—Benedict V. Safourek
Attorney, Agent, or Firm—Cameron, Kerkam, Sutton, Stowell & Stowell

[57] ABSTRACT

Remote controlled vehicle systems for the surveillance of and/or action on objects spaced from the point of control including a control or information receiving station and means for modulating a beam of light receivable at the control or information receiving station by intelligence bearing signals generated at the vehicle.

The beam of light receivable at the control station may be a laser beam or a light beam carried by an optically conductive fiber or fiber bundle.

Control signals may be transmitted to the vehicle by a modulated laser beam or a fiber-carried beam or by radio frequency signals.

17 Claims, 11 Drawing Figures

REMOTE CONTROLLED VEHICLE SYSTEMS

The invention relates to remotely controlled vehicles for the surveillance of and/or action on objects spaced from the point of control.

Remotely piloted vehicles require two way communication between the vehicle and the control station. Relatively small band width capability is required from control station to the vehicle for purposes of control commands. Relatively large band width capability is required from the vehicle to the control station (i.e., video signals) to enable the controller to properly pilot the vehicle. The invention relates to vehicle systems made feasible by the use of unique optical communication systems.

The communication systems of the invention include a control station and means for modulating a beam of light receivable at the control station by intelligence bearing signals generated at the vehicle. The beam of light receivable at the control station may be a laser beam or a light beam carried by an optically conductive fiber or fiber bundle.

In one form of the invention the vehicle is associated in an assembly with a beam-modulating retroreflector receiving a laser beam from and returning informational signals to a control station. The control station may be land based or carried on a land vehicle, a boat, or an aircraft. The return beam from the retroreflector to the control station is modulated, for example, by means more fully described hereinafter, to impress thereon informational signals carrying intelligence picked up by sensing devices carried by the vehicle, such as a television camera which may have a variable direction field of view and which may be aimed by the control station operator, for example, by the head motion of the operator.

The retroreflector is mounted in association with the vehicle for separation therefrom in response to a signal from the control station and carrier means such as parachutes, floats, drone planes or the like, are provided to support the separated retroreflector in substantially the location and altitude at which it is separated. An extensible filament, such as an electroconductive wire or an optically conductive fiber, carried in a coil or other extensible mountings on the vehicle and perhaps also on the retroreflector, serves to maintain communication between the vehicle and the retroreflector after separation of the retroreflector from the vehicle.

The vehicle may carry explodable charges actuated on impact, by proximity or by remote control from the control station through the extensible filament. It may be propelled, for example, by one or more wing-mounted propellers driven by battery-actuated electric motors, or by jet nozzles supplied with a combustible gas stream or by other means of propulsion.

Modulation of the laser beam retroreflector is advantageously effected by means of the Stark effect, for example, by $NH_2D$ modulation of the 10.6 $\mu$ line of a $CO_2$ laser as described by Johnston and Melville in an article entitled "Stark-Effect Modulation of a $CO_2$ Laser by $NH_2D$" in *Applied Physics Letters;* Vol. 18, No. 12 (Dec. 1971) at pages 503–506.

The invention will be further described with reference to the accompanying drawings in which.

Figure 1:
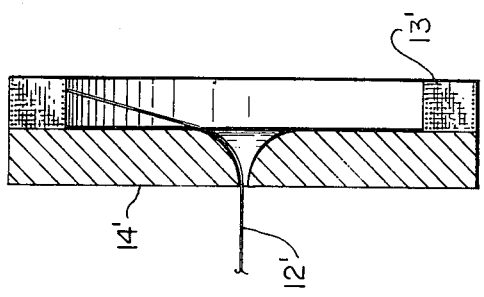
FIG. 1 is a diagrammatic representation in side view of one form of remote controlled vehicle system embodying the principles of the invention.
Figure 2:
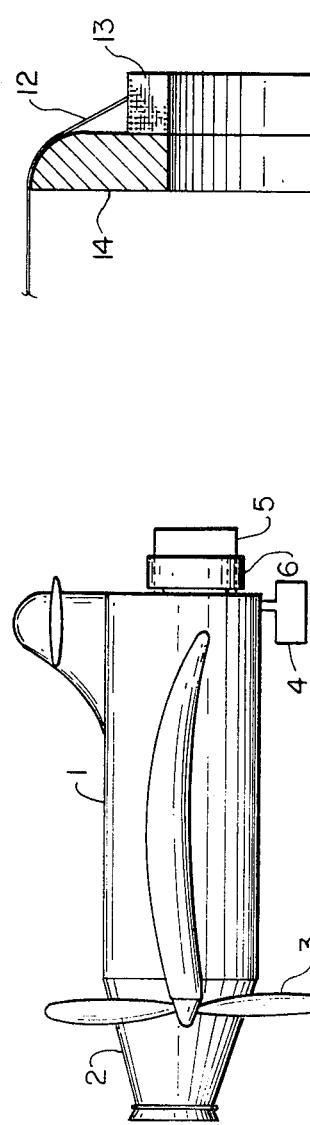
FIG. 2 is a rear view of the vehicle system of FIG 1.

In FIGS. 1 and 2, 1 is the main body of the vehicle carrying at its forward end a television camera 2 and propelled by wing-mounted propellers 3 driven by battery-actuated electric motors (not shown) positioned in the wings. Mounted on the rear end of the vehicle are the retroreflector 4, shown in more detail in FIG. 3, and optical receiver 4', a container 5 for a parachute which is connected to retroreflector 4 and receiver 4', and a filament real 6, representative forms of which are shown in more detail in FIGS. 4 and 5.

Figure 3:
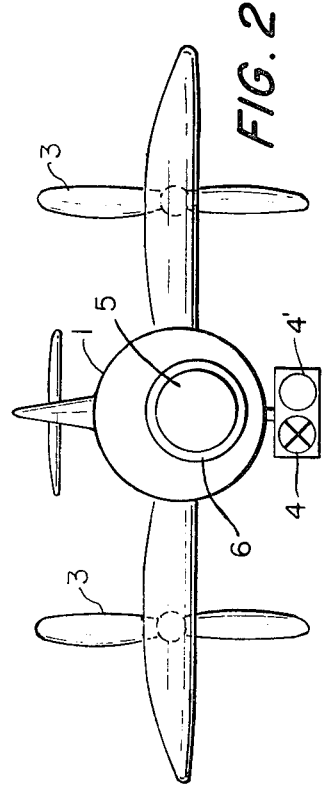
FIG. 3 is a diagrammatic representation in partial section of a Stark effect laser beam modulated retroreflector which may be used in the vehicle system of the invention.

The modulatable retroreflector shown by way of example in FIG. 3 comprises a corner cube 7, mounted in container 8, having a germanium window 9 and containing $NH_2D$ gas. Modulating voltage is supplied from the television camera 2 of FIG. 1 or other sensing device through conductors 10, 10' to electrodes 11, 11'.

Figure 4:
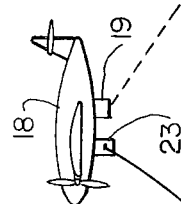
FIGS. 4 and 5 are diagrammatic representations of two forms of filament pay-out guides which may be used in the vehicle system of the invention.
Figure 5:
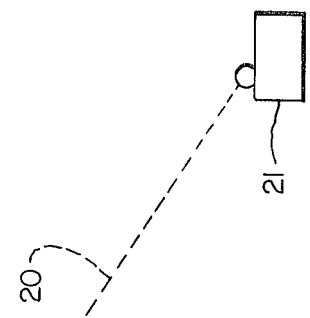

In the filament payout reel of FIG. 4, filament 12 is paid out from the outside of coil 13 mounted on guide 14, while in the payout reel of FIG. 5 the filament 12' is paid out from the inside of coil 13' mounted on guide 14'. In either form a filament payout reel will be mounted on or in the vehicle body with the fixed end of the filament connected to the sensors and controls carried by the vehicle body. The payed out end may be connected to the retroreflector assembly either directly or through another filament payout reel mounted on the retroreflector assembly.

Figure 6:
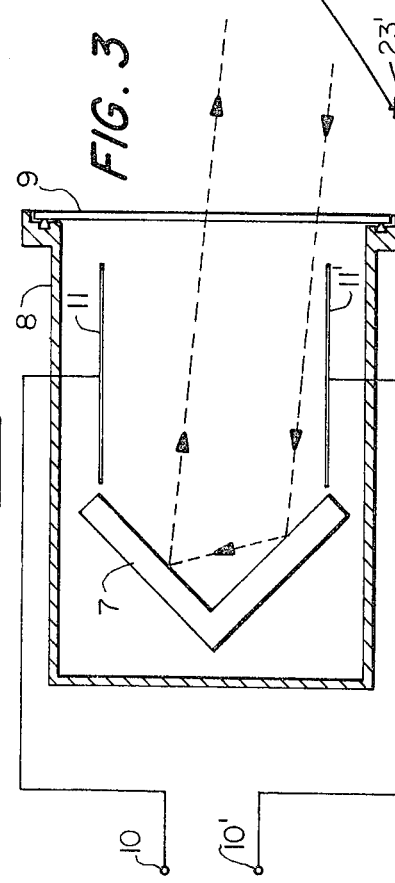
FIG. 6 is a diagrammatic representation of a modified form of the vehicle system of the invention.

In the form of the invention shown in FIG. 6 at a late stage in the utilization thereof, a vehicle 15 carrying a sensing device 16 and wing-mounted propellers 17 as in FIGS. 1 and 2 is shown at or near its target area after separation from the carrier 18, shown as a drone plane, on which the retroreflector/optical receiver assembly 19, in the line of sight of laser beam 20 from control station 21, is mounted. Filament 22, connecting the retroreflector/optical receiver assembly 19 and the vehicle 15, is paid out from reels 23 and 23' mounted respectively on carrier 18 and vehicle 15 and provides communication from vehicle 15 to the control station via retroreflector/optical receiver assembly 19. Communication from the control station to the vehicle 15 is via the laser beam 20 which is received by retroreflector/optical receiver assembly 19 and thence relayed over filament 22 to vehicle 15.

In FIGS. 7 through 11, $C_1$, $C_2$, $C_3$, $C_4$ and $C_5$ represent control stations, $V_1$, $V_2$, $V_3$, $V_4$ and $V_5$ represent remote controlled vehicles, $R_1$ and $R_2$ represent separable retroreflector assemblies, $R_3$ and $R_4$ represent retroreflector assemblies fixed to the vehicles, RF indicates radio frequency signals, Las indicates laser beams and OF indicates light carrying filaments. Arrows indicate the direction of information flow.

Figure 7:
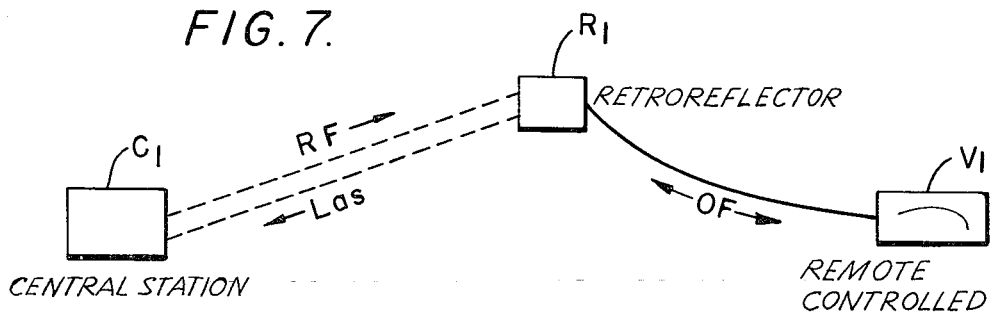
FIGS. 7 through 11 are schematic representations of further forms of the remote controlled vehicle systems of the invention.

In FIG. 7, a laser beam from control station $C_1$ is modulated at retroreflector $R_1$ to transmit intelligence data received from vehicle $V_1$ via filament OF back to the control station which actuates retroreflector assembly $R_1$ via the RF signal to transmit control signals to vehicle $V_1$ via filament OF.

Figure 8:
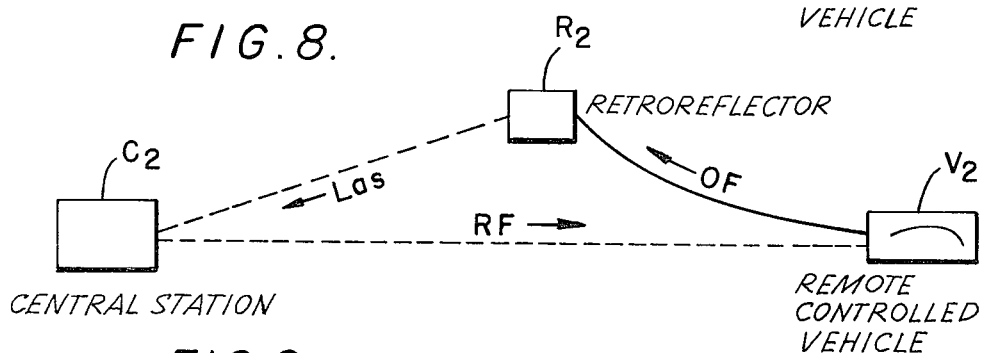

In FIG. 8, the control signals from control station $C_2$ based on intelligence signals transmitted by filament OF to retroreflector $R_2$ and thence to the control station via the modulated laser beam, are sent directly to vehicle $V_2$ as radio frequency signals.

Figure 9:
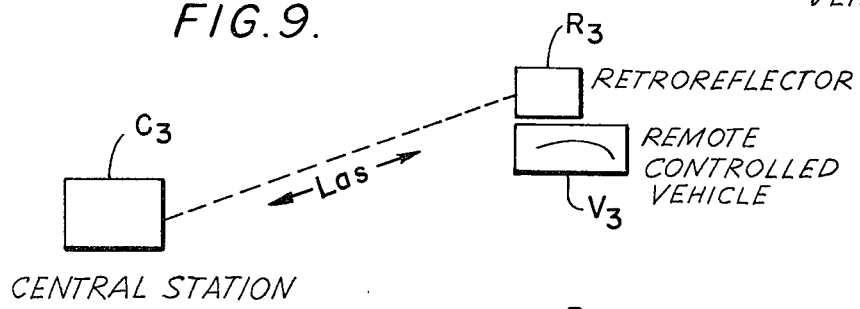

In FIG. 9, the control signals from control station $C_3$ based on intelligence signals from vehicle $V_3$, transmitted by modulated retroreflected laser beam from $R_3$, are transmitted to vehicle $V_3$ via the laser beam from the control station.

Figure 10:
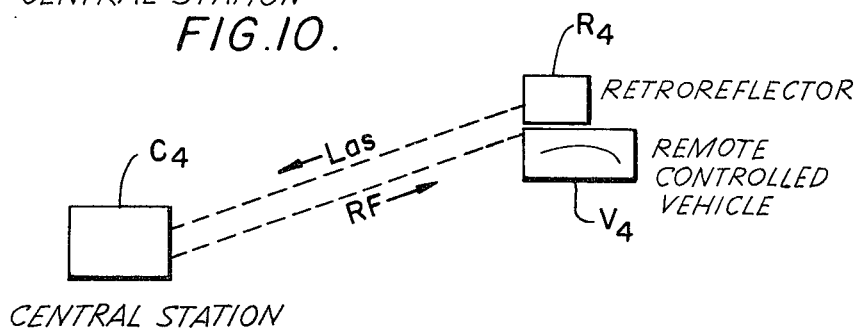

The system of FIG. 10 is similar to that of FIG. 9, except that the control signals based on the modulated retroreflected laser beam from $R_4$ are sent from control station $C_4$ as radio frequency signals.

Figure 11:
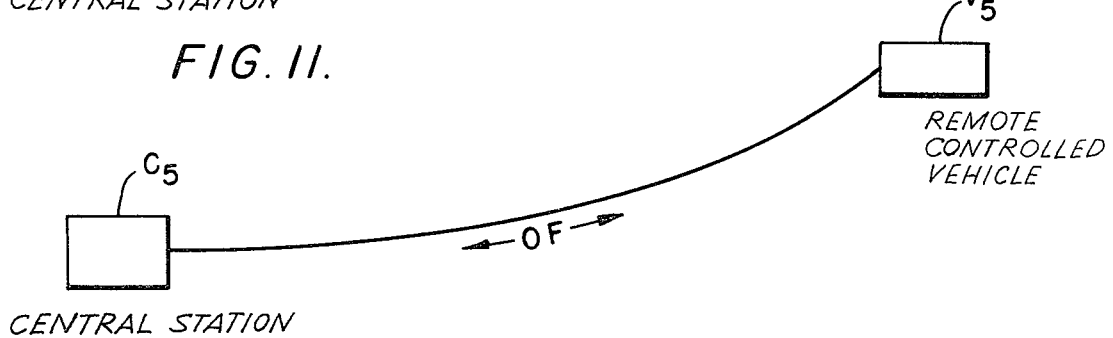

In the system of FIG. 11, intelligence signals from vehicle $V_5$ and control signals from station $C_5$ are carried between the vehicle and the station by filament OF.

In all of these forms of the invention, the control station may be based on land, or carried on a land vehicle, a boat or an aircraft and the vehicles may be aircraft, land vehicles or boats.

It will be seen that the remote controlled vehicle systems of the invention are very useful for the observation and/or destruction of objects out of the line of sight of a control station because of an intervening ridge or when the objects are disposed in rough terrain or immersed in a water body, while avoiding detection of the control station, exposing minimal components to detection from the vicinity of the object or elsewhere.

By the use of a laser beam addressing a beam-modulatable retroreflector carried in the line of sight of the control station, as in the embodiments shown in FIGS. 6 and 9, radiation of radar or lower frequency radiation from the control station or from the retroreflector support may be eliminated. The laser control beam is detectable only in the direct line of sight between the control station and the retroreflector support and the filaments connecting the retroreflector and the observing and/or destruct vehicle are virtually undetectable because of their small aspect, nonrectilinear path and minimal energy radiation.

I claim:

1. A communication system for the remote control of a vehicle, control mechanism carried by the vehicle to be controlled, a control station, means for generating electromagnetic control signals at said control station, means for generating intelligence bearing signals at the vehicle, means for modulating a beam of light receivable at the control station by said intelligence bearing signals generated at the vehicle wherein the vehicle is controlled by electromagnetic signals imposed at the control station and wherein the modulating means comprises a retroreflector carried by the vehicle.

2. A communication system as defined in claim 1 wherein the beam of light is a laser beam.

3. A communication system as defined in claim 2 wherein the laser beam is generated at the control station.

4. A communication system as defined in claim 1 wherein the retroreflector is separably associated with the vehicle.

5. A communication system as defined in claim 1 including a laser beam generating means at the control station and the electromagnetic signals comprise signals imposed on said laser beam.

6. A communication system as defined in claim 1 wherein the vehicle is controlled by radio frequency signals generated at the control station.

7. A communication system as defined in claim 1 wherein the laser beam signals are modulated by the use of the Stark effect upon a gas-filled cell in the path of the beam to the retroreflector.

8. A communication system as defined in claim 1 wherein the retroreflector is a corner cube retroreflector.

9. A remotely piloted assembly as defined in claim 8 wherein the laser beam signals are modulated by the use of the Stark effect upon a gas-filled cell in the path of the beam to the retroreflector.

10. A remotely piloted assembly including a vehicle, a beam-modulating retroreflector receiving laser-beam-carried control signals from a control station, means for releasably mounting the retroreflector to the vehicle and optical filament means connecting the vehicle and the retroreflector for transmitting signals between the vehicle and the control station.

11. A communication system as defined in claim 10 wherein the beam of light is carried by said optical filament means.

12. A remotely piloted assembly as defined in claim 10 wherein the laser beam signals are modulated by the use of the Stark effect upon a gas-filled cell in the path of the beam to the retroreflector.

13. A remotely piloted assembly as defined in claim 10 including a parachute extendible to support the retroreflector.

14. A remotely piloted assembly as defined in claim 10 wherein the retroreflector is mounted on a separate independently controllable carrier means.

15. A remotely piloted assembly as defined in claim 10 wherein the filament means is an electroconductive wire.

16. A remotely piloted assembly as defined in claim 10 wherein the filament means is an optically conductive fiber.

17. A remotely piloted assembly as defined in claim 10 wherein the retroreflector is a corner cube retroreflector.

* * * * *